United States Patent [19]

Johnson et al.

[11] Patent Number: 4,853,846
[45] Date of Patent: Aug. 1, 1989

[54] BUS EXPANDER WITH LOGIC FOR VIRTUALIZING SINGLE CACHE CONTROL INTO DUAL CHANNELS WITH SEPARATE DIRECTORIES AND PREFETCH FOR DIFFERENT PROCESSORS

[75] Inventors: David B. Johnson, Portland; Ronald J. Ebersole, Beaverton; Joel C. Huang, Portland, all of Oreg.; Manfred Neugebauer, Erlangen, Fed. Rep. of Germany; Steven R. Page, Hillsboro; Keith S. Self, Aloha, both of Oreg.

[73] Assignee: Intel Corporation, Santa Clara, Calif.

[21] Appl. No.: 890,859

[22] Filed: Jul. 29, 1986

[51] Int. Cl.[4] .................. G06F 12/00; G06F 12/02; G06F 12/08; G06F 12/12

[52] U.S. Cl. .................. 364/200; 364/243.41; 364/243.44; 364/240; 364/240.5

[58] Field of Search ... 364/200 MS File, 900 MS File

[56] References Cited

U.S. PATENT DOCUMENTS

| | | | |
|---|---|---|---|
| 4,047,244 | 9/1977 | Finkemeyer et al. | 364/200 |
| 4,371,929 | 2/1983 | Brann et al. | 364/200 |
| 4,400,770 | 8/1983 | Chan et al. | 364/200 |
| 4,445,174 | 4/1984 | Fletcher | 364/200 |
| 4,484,267 | 11/1984 | Fletcher | 364/200 |
| 4,533,995 | 8/1985 | Christian et al. | 364/200 |
| 4,622,631 | 11/1986 | Frank et al. | 364/200 |
| 4,736,293 | 4/1988 | Patrick | 364/200 |

Primary Examiner—Archie E. Williams, Jr.
Assistant Examiner—Robert B. Harrell
Attorney, Agent, or Firm—Owen L. Lamb

[57] ABSTRACT

Control logic for controlling references to a cache (24) including a cache directory (62) which is capable of being configured into a plurality of ways, each way including tag and valid-bit storage for associatively searching the directory (62) for cache data-array addresses. A cache-configuration register and control logic (64) splits the cache directory (62) into two logical directories, one directory for controlling requests from a first processor and the other directory for controlling requests from a second processor. A prefetch buffer (63) is provided along with a prefetch control register for splitting the prefetch buffer into two logical channels, a first channel for handling prefetches associated with requests from the first processor, and a second channel for handling prefetches associated with requests from the second processor.

4 Claims, 7 Drawing Sheets

NOTES: = = = VALID DATA, ‾ ‾ ‾ HIGH, ___ LOW, XX INVALID

FIG. 6 - CACHE CONFIGURATION REGISTER

FIG. 7 - SYSTEM (AP) BUS MASK AND MATCH REGISTERS

BUS EXPANDER WITH LOGIC FOR VIRTUALIZING SINGLE CACHE CONTROL INTO DUAL CHANNELS WITH SEPARATE DIRECTORIES AND PREFETCH FOR DIFFERENT PROCESSORS

TECHNICAL FIELD

The present invention relates to data processing systems and more particularly, to a directory for controlling a cache which provides local storage for frequently accessed memory locations.

BACKGROUND ART

A cache is a relatively high-speed, small, local memory which is used to provide a local storage for frequently accessed memory locations of a larger, relatively slow, main memory. By storing the information or a copy of the information locally, the cache is able to intercept memory references and handle them directly without transferring the request to the main memory over the system bus. The result is lower traffic on the memory bus and decreased latency on the local bus to the requesting processor. In a multiprocessing system, the use of a cache also increases potential systems' performance by reducing each processor's demand for system bus bandwidth, thus allowing more processors in the system.

It is advantageous to have a single cache and cache directory which is shared by a number of processors. In very large scale integration (VLSI) systems it is also advantageous to be able to configure the cache so that it can handle one, two, or more processors, depending upon the configuration of the system.

It is therefore an object of the present invention to provide a cache directory and control which can be split into two or more logical directories, for controlling requests from two or more processors.

It is also an object of this invention to provide a prefetch buffer and control for the prefetch buffer that will enable the buffer to be split into two or more logical channels for handling cache prefetches associated with requests from two or more processors.

SUMMARY OF THE INVENTION

Briefly, the above objects are accomplished in accordance with the invention by providing a cache directory which is capable of being configured into a plurality of ways, each way including tag and valid-bit storage for associatively searching the directory for cache data-array addresses. A cache configuration register splits the cache directory into two or more logical directories which are able to control requests from two or more processors.

A prefetch buffer is provided along with a prefetch control register which splits the prefetch buffer into two or more logical channels. The logical channels handle cache prefetches associated with requests from two or more processors.

The invention has the advantage that a single cache directory and control can be shared by two or more processors and is capable of being configured to the number of processors available in the system.

BRIEF DESCRIPTION OF THE DRAWINGS

The invention will be apparent from the following, more particular description of the preferred embodiment of the invention as illustrated in the accompanying drawings, wherein.

BEST MODE FOR CARRYING OUT THE INVENTION

Figure 1:
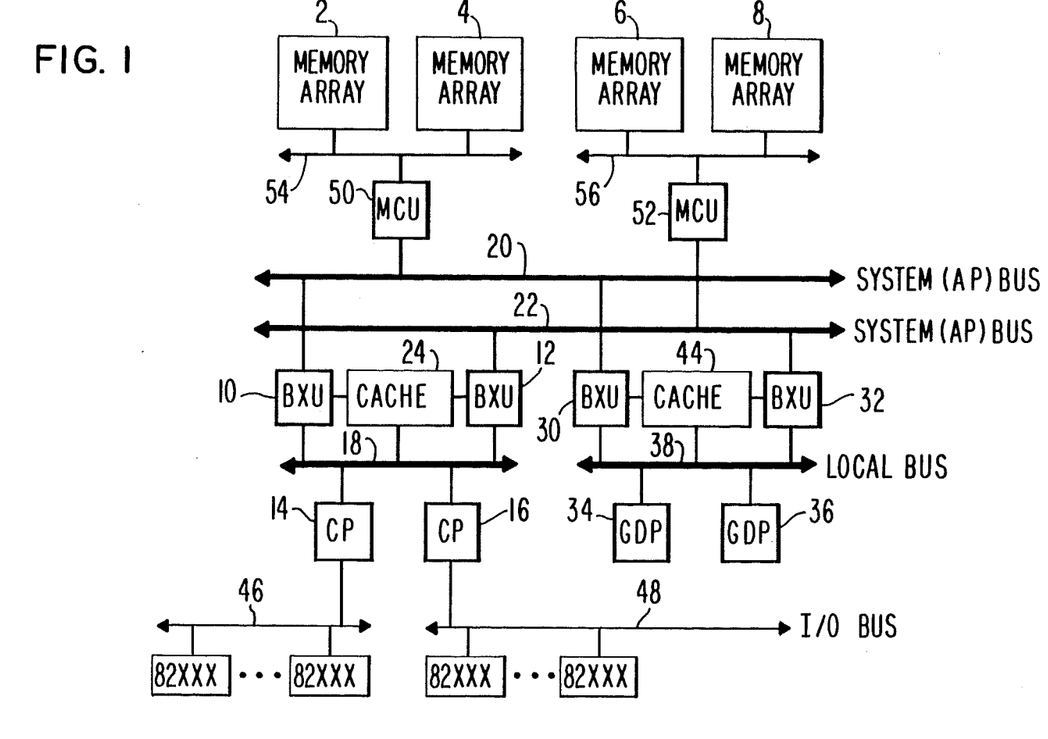
FIG. 1 is a block diagram of a dual-system bus multiprocessing system in which the invention may be embodied.

Refer now to FIG. 1 which is a block diagram of a dual-system bus multiprocessing system. Bus expander units (10, 12, 30, 32) are attached to dual-system busses (20, 22) and to local busses (18, 38). The local busses provide the interface to channel processors (14, 16) and generalized data processors (34, 36). The local bus is controlled on the bus expander unit (BXU) side by a local bus control logic (68). This logic provides address recognizers to support multiple-memory address ranges. It also supports cooperation between multiple bus expander units to provide efficient operation with the multiple buses (20, 22).

Figure 2:
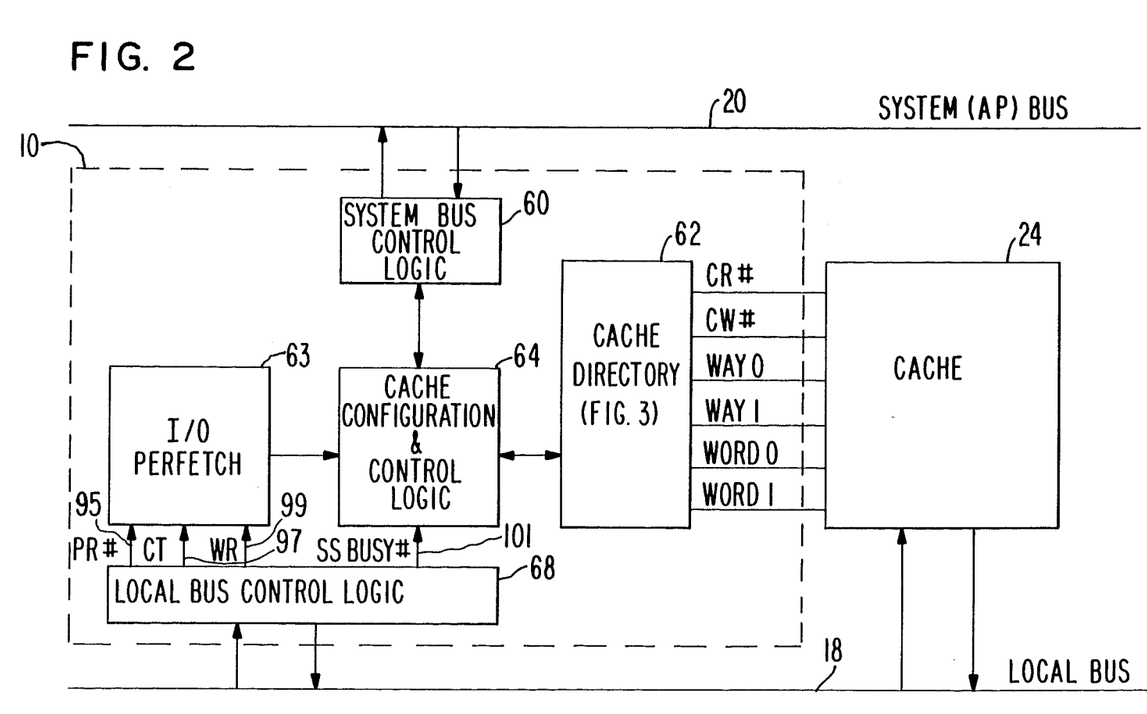
FIG. 2 is a block diagram of a bus expander unit (BXU) in which the present invention is embodied.

Refer to FIG. 2 which is a block diagram of the bus expander unit (10) shown in FIG. 1. The bus expander unit (10) is attached to a system bus (20) through a system bus control logic (60) and to a local bus (18) through local bus control logic (68). The system bus (20) is more fully described in US Pat. No. 4,315,308, which is assigned to Intel Corporation. The system bus control logic (60) includes logic for arbitration, pipeline monitoring, address recognition, and bus signaling, as described in the above-identified patent. The system bus control logic (60) provides buffering to hold requests and replies as they move between the bus and the internal logic of the BXU. The system bus control logic (60) provides six buffers, each capable of holding an entire bus packet. Three buffers are allocated for outbound requests, and three for inbound requests. Two prefetch channels (channel 0 data in, channel 0 data out and channel 1 data in, channel 1 data out of FIG. 4) are provided for handling I/O transfer streams. Each channel provides two 16-byte buffers (82, 84 and 86, 88, of FIG. 4). As the channel processor requests data from the buffers, the BXU automatically prefetches the next data block. This provides a significant increase in I/O performance, because the channel processors requests for data are handled immediately from the prefetch buffers.

Channel Processors

The channel processors (14, 16) of FIG. 1 provide for control of data transfers to and from devices attached to the I/O buses (46, 48).

Memory Control Units

The memory control units (50, 52) provide for control of data transfers to and from memory arrays (2, 4, 6, 8) attached to the memory buses (54, 56).

Cache Directory and Control Logic

Figure 3:
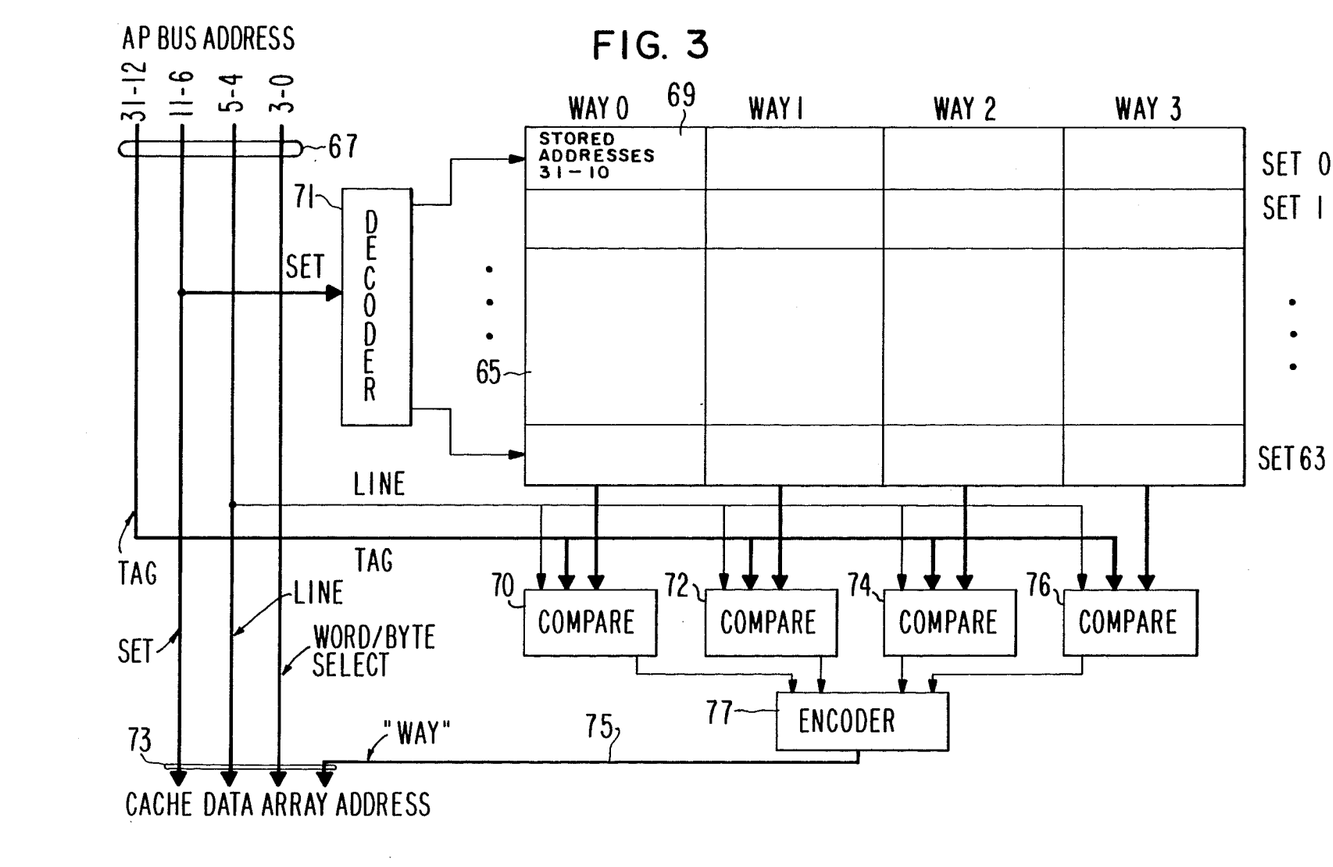
FIG. 3 is a block diagram of the cache directory of FIG. 2.

The cache directory (62) and control (64) in the BXU of FIG. 2, shown in more detail in FIG. 3, controls a cache (24) which may be external to the BXU, or may be located on the same chip as the BXU. The advantage of an external cache is that larger cache memories can be supported.

Refer to FIG. 3. The function of the directory (62) is to store addresses which correspond to data which are stored in the cache (24) memory. The directory can be configured into one or more ways. In FIG. 3, the directory is configured into four ways (0, 1, 2, 3). A line is the basic unit of data transferred between the cache and the main memory. It consists of 16 bytes of data. A line is also known as a transfer block. If the data corresponding to a particular address is stored in the cache, the cache can supply the data, thusly avoiding a main memory access. This is referred to as a "cache hit." The decision, hit or miss, is determined on a per line basis. An address block is the basic unit of cache addressing. Each address block describes the physical address of eight or four contiguous lines of data.

There is a valid bit associated with each line within an address block. If the line is present in the cache, then the valid bit is turned on. The address information held in the cache directory is referred to as a tag. Since many addresses map to a single address block, the tag information is used to identify the exact memory locations that are currently associated with an address block. A hit occurs when the tag of an address block matches the bus address and the desired line valid bit is on.

Each way provides storage for the tag and valid bits. In the case of multiple ways, as shown in FIG. 3, multiple simultaneous comparisons are made in the compare circuits (70-76) between the AP bus address (Line and Tag portions) and the tag fields in the ways to determine if the data is in the cache data array. A set is a grouping of address blocks consisting of one address block from each way. All of the address blocks in a set are simultaneously selected when a portion (bits 6-11) of the AP bus address is decoded into a set address by the decoder (71). The directory of FIG. 3 provides for 64 sets.

To summarize, the cache is structured as four-way set associative, with 64 sets (Set 0-Set 63). The data unit selected by the way (1 out of 4) and the set (1 out of 64) is called an address block (69). Each address block contains 4 lines, and each line contains 16 bytes of data. The 16 bytes of data in a line are organized as 4 words of 4 bytes, each with an associated tag bit to support the bus tag portion (Bus address bits 12-31) of the bus address (67).

When a new block of data needs to be pulled into the cache, it may be necessary to remove an old block of data that is already in the cache to make room for the new data. There is a random sequence for determining which address block (way) gets selected when a new address is needed in an address block.

When a write transaction on the local bus involves an address which is not in the cache (a cache miss), no attempt is made to store the corresponding data in the cache. However, when a write transaction on the local bus involves an address which is in the cache (a cache hit), the directory uses a write-through policy. This means that local bus writes that result in a cache hit are written into the cache as well as main memory. This ensures that main memory always holds a valid copy of all data locations.

Cache Configuration Register

Figure 6:
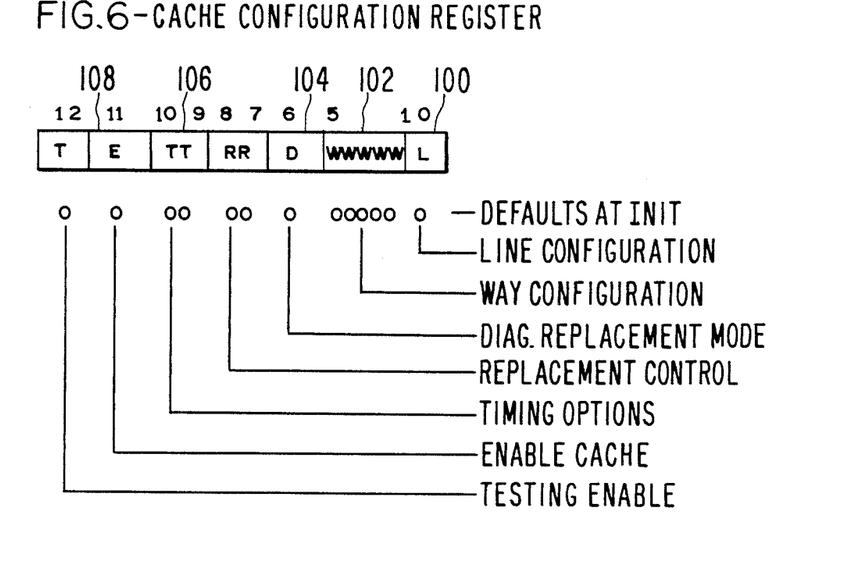
FIG. 6 is a block diagram of the cache configuration register within the cache configuration & control logic of FIG. 2.

The cache configuration register, which is located in the cache configuration and control logic (64) of FIG. 2, is shown in FIG. 6:

The cache configuration register contains the bits that determine the number of lines per address block (100), the number of ways in the cache directory (102), diagnostic bits (104), timing bits (106), and an enable-cache bit (108), which enables the cache for operation.

If a Generalized data processor (GDP) utilizes multiple BXUs, as shown in FIG. 1, these BXUs may be configured to work cooperatively to provide a larger directory and addressing for a larger data store. The BXUs work together as a single logical unit. Essentially, this larger directory has an increased number of sets. Thus, a cache managed by two BXUs will have a directory consisting of 128 sets instead of 64. In order for multiple BXUs to work together, the cache must be set-up for interleaving. The number of BXUs must be the same as the interleaving factor. If there is no interleaving, the cache must be controlled by a single BXU. Interleaving is set up by the interleave control bits in the match register in the system bus control logic (60), shown in FIG. 7:

Memory Address Recognition

The system bus control logic (60) contains one address recognizer. Its purpose is to partition the address space into a local bus address space and a system bus address space. The logic does not alter the address of a reference that it passes to the local bus. The address recognizer is used to recognize the address of all addresses of requests that fall below the upper 16 Mbytes of address space.

Figure 7:
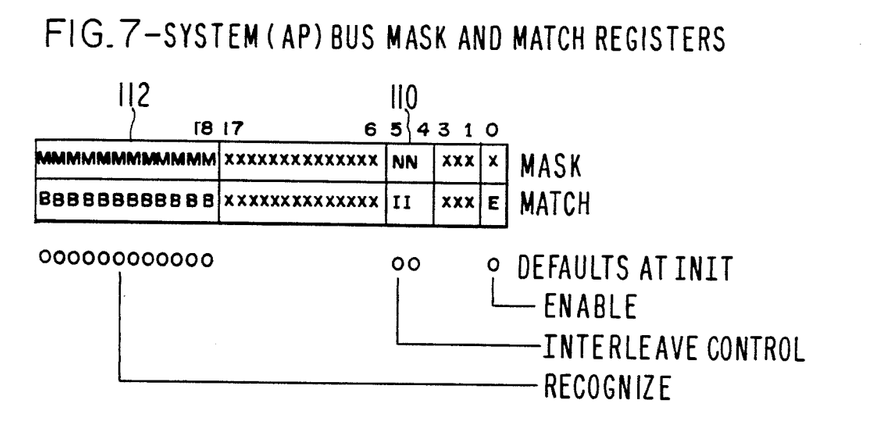
FIG. 7 is a block diagram of the system (AP) bus mask and match registers within the cache configuration & control logic of FIG. 2.

The address recognizer consists of two registers, the Match register and the Mask register, shown in FIG. 7. Together they define a window mapping memory from one bus to the other. The Match register defines where the local bus address space begins in the total address space on the system bus (the "Base"), and the Mask register defines how much of the address space available on the system bus is mapped to the local bus (the "Size").

The Mask register is used to mask off the address bits that select a location in the local bus address space. The size of the address space mapped to the opposite bus determines the number of low-order zeros in the Mask register. That is, to recognize two NO bytes for transfer to the opposite bus, the N low-order bits of the recognize field (112) of the mask register must be filled with zeros. The upper bits from N to 31 must be filled with ones. The size of the mapping window ranges from 256K bytes to the full address space (4G bytes).

The Match register is used to select where in the AP bus address space the address space of the local bus is located. The N low-order bits of the recognize field (112) of the Match register are ignored, since they are masked by the Mask register. This means that the opposite bus address space must be aligned on integer multiples of the address range recognized.

Bus Interleaving

The system bus control logic (60) supports memory interleaving. This is referred to as module interleaving. Interleaving consists of propagating requests on discontiguous 16-byte boundaries, with 16-byte granularity. The interleaving may be one way (no interleaving), two way, or four way. One-way interleaving means that every request recognized by the system bus control logic (60) memory-address recognizer is handled by the BXU. When two-way interleaved, the system bus address space is effectively divided into two partitions, with address 0-15, 32-47, ... assigned to the first partition and addresses 16-31, 48-63, ... assigned to the second partition. A BXU can respond only when an access is recognized by the local bus address recognizer and falls within its assigned partition. Four-way interleaving functions like two way, but four partitions exist, with the first one consisting of 0-15, 64-77, etc.

In any case, the BXU does not modify the address before it is passed to the local bus. The interleaving functions are controlled by the Interleave control bits (110) in the Match and Mask registers.

Address Recognizer

The actual address-recognizer-register set consists of a pair of Match/Mask registers. Both the Match register and the AP bus address are masked by the Mask register, and the results are compared to determine if the access is recognized. In general, the Recognize fields (112) of the Mask and Match registers determine the location of the mapping windows. These fields are what is commonly referred to when discussing the address recognizers.

Match/mask Register Field Definitions

Recognize: In the Mask register, each bit in the Recognize field (112) that is set will cause the corresponding AP bus address bit to be compared against the corresponding Match register bit. If a bit is cleared, then that bit position is a "don't care" during address recognition.

In the Match register, each bit in the Recognize field (112) will be compared against the corresponding bits of AP bus address range. Thus, these bits provide an address for the partition of memory that is recognized by this address recognizer.

Interleave Control: These two fields (110) determine the interleaving factor and matching for recognizer in the system bus control logic (60). The table below shows the impact of the different configurations of these bits.

| Mask Bits | Match Bits | AD5, AD4 required for match |
| --- | --- | --- |
| 00 | xx | xx (no interleaving) |
| 01 | x0 | x0 (2 way) |
| 01 | x1 | x1 |
| 10 ILLEGAL | xx | xx |
| 11 | 00 | 00 (4 way) |
| 11 | 01 | 01 |
| 11 | 10 | 10 |

-continued

| Mask Bits | Match Bits | AD5, AD4 required for match |
| --- | --- | --- |
| 11 | 11 | 11 |

ENABLE

1 = The set of Mask and Match registers is enabled.
0 = This recognizer is disabled.

Local Bus Control Logic

Figure 8:
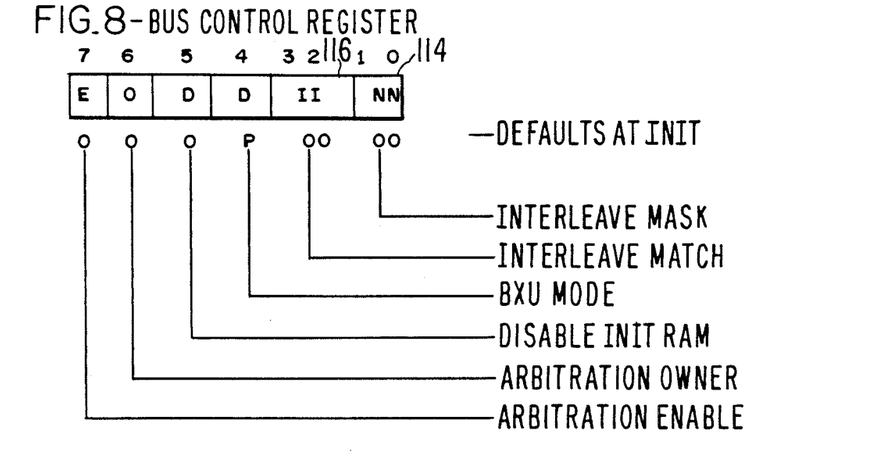
FIG. 8 is a block diagram of the local bus control register within the cache configuration & control logic of FIG. 2; and, FIG. 9 is a block diagram of the prefetch control register within the cache configuration & control logic of FIG. 2.
Figure 9:
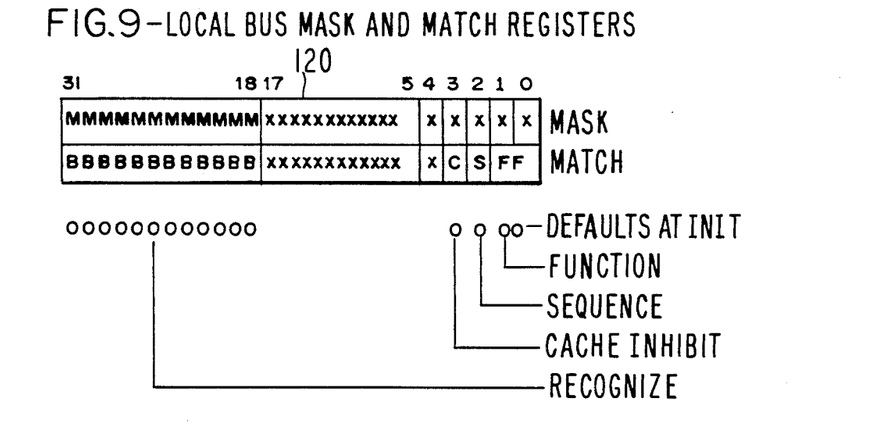
Figure 10:
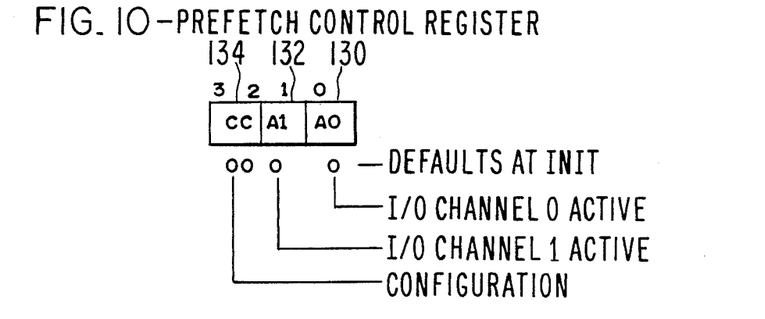

The local bus control logic (68) has four memory address recognizers and the control registers shown in FIGS. 8 and 9.

The bits in the Local Bus Control Register shown in FIG. 8 are defined as follows:

INTERLEAVE MASK/MATCH

These two field (114, 116) determine the interleaving factor and matching for the cache control logic (64), and the memory address recognizers in the local bus control logic that have interleaving enabled.

BXU MODE

0 = memory mode.
1 = processor mode.

DISABLE INIT RAM

0 = INIT RAM memory recognizer is turned off.
1 = INIT RAM memory recognizer is turned on.

ARBITRATION OWNER

1 = owner.
0 = renter.

ARBITRATION ENABLE

1 = BXU will drive and monitor arbitration lines as owner or renter.
0 = BXU will ignore the arbitration lines.

The bits in the Local Bus Mask and Match Registers shown in FIG. 9 are defined as follows:

FUNCTION

00 = This set of registers is disabled.
01 = This set of registers have bus recovery enabled and use the interleave configuration bits in the local bus control register to make caching possible. Interleaving is controlled by the local bus control register.

RECOGNIZE

In the MASK register each bit in this field (120) that is set will cause a corresponding local bus address bit to be compared with the corresponding match register bit.

In the MATCH register each bit in this field (120) will be compared against the corresponding local bus address bit. These bits provide a base address for the partition of memory that is recognized by this address recognizer.

CACHE INHIBIT

1 = requests that are within the address range recognized by this recognizer will not be cached.
0 = requests that are within the address range recognized by this recognizer will be cached provided other control bits are set properly.

Cache Prefetch

A cache prefetch algorithm is utilized by the BXU to increase processor performance without significantly increasing the processor's use of the bus. A prefetch is triggered if the current request is a four-word cacheable read (CR), the next sequential line is not in the cache, and the next sequential line is in the same address block as the currently requested line. In the present embodiment of the invention, processor instruction fetches and string operations both use four-word read accesses. A four-word read access is the only access type that has a high probability of being followed by an access to the next location in main memory. Of course, the invention may be practiced in systems using other than four-word accesses, that is, N-word accesses, so long as the N-word access type has a high probability of being followed by an access to the next location in main memory.

The line that is prefetched is the next sequential line. If the BXUs are interleaved, the current request will be handled by one BXU, while the prefetch will be done by another BXU. When data is prefetched, four words are brought into the BXU. This data is held internally, and it is not written out to the cache. If a subsequent request is generated for this location, it will be handled as a cache miss, but no bus requests will be generated. The cache will be filled immediately from the BXU's internal buffer rather than making a request to the main memory.

Figure 4:
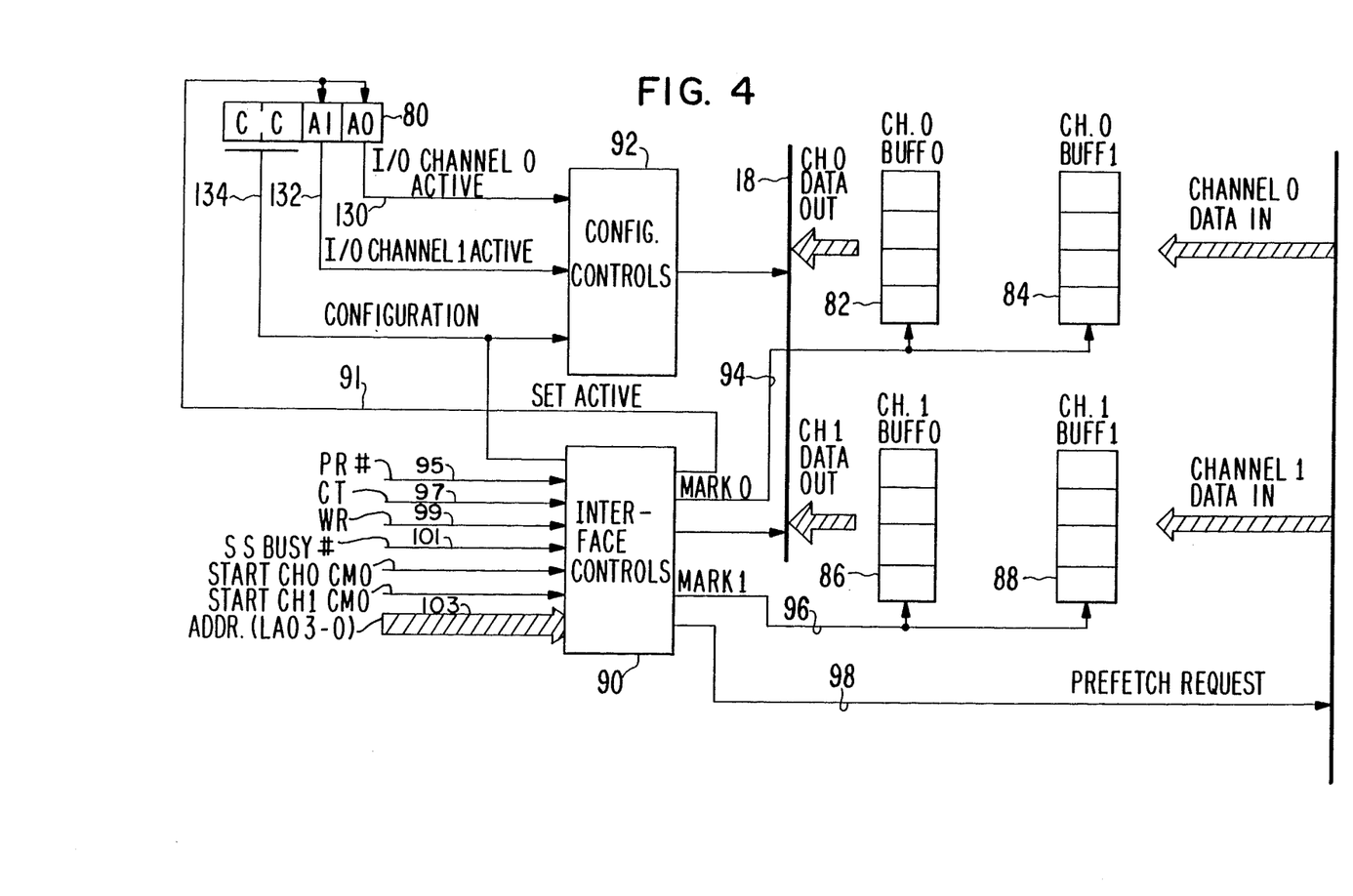
FIG. 4 is a more detailed block diagram of the I/O Prefetch logic shown in FIG. 2.

As shown in FIG. 4, there are two prefetch channels (channel 0, channel 1) in the BXU. If both channels are enabled, each one will be assigned to a specific processor. These two channels are totally independent. The state, or data, in a prefetch channel is never changed by the actions of the other processor or prefetch channel.

The directory and control logic guarantees that the cache data and the cache prefetch data will be consistent with the latest version of the data in main memory, even in the presence of multiple caches. This is accomplished by the update policy which requires that when data is written into the cache (24), it is also written through to the main memory. Secondly, the system bus (20) is monitored for changes to memory locations which are currently in the cache.

The write-through update policy ensures that main memory will always have the most recent copy of all data. That is, a BXU cache will never hold the only valid copy of data. Any access that is allowed to flow through to main memory is always guaranteed to get the latest copy of a data item. An update to the cache cannot be made without sending a write request on the AP bus (20) to thereby update the main memory.

The coherency mechanism monitors all bus requests. When it detects a write request from another BXU, or a write request from itself, the address of that request is fed into the cache directory (62). If a cache hit occurs, then the line corresponding to the hit is marked invalid. This coherency mechanism is applicable to both the cache directory (62) and the I/O logic (63) prefetch.

Cache Fill Sequence

Figure 5:
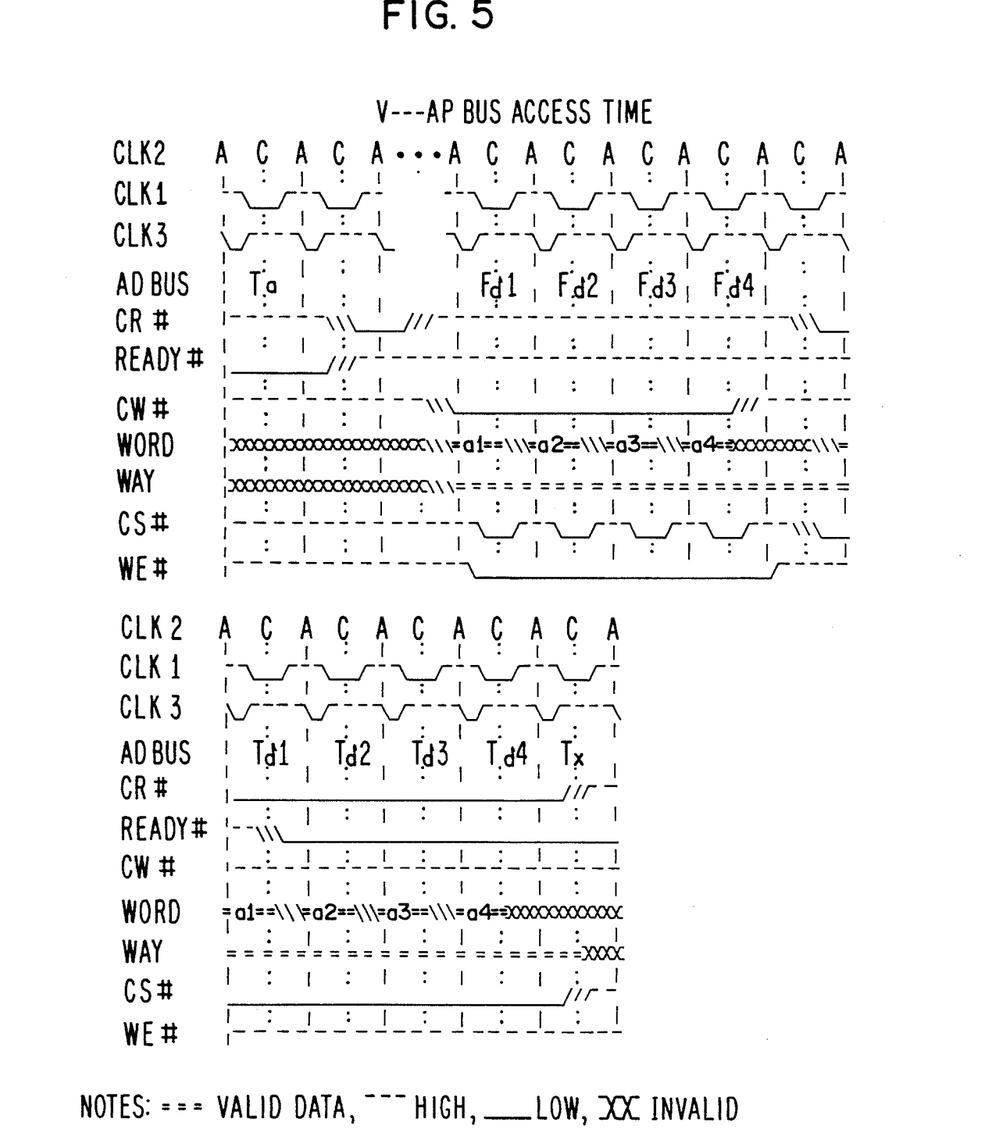
FIG. 5 is a timing diagram of a typical cache fill operation.

When the processor issues a cacheable read (CR#) request during a Ta cycle (see FIG. 5) that results in a cache miss, the BXU must first fetch the missing cache (line of 4 words (a1 ... a4) from memory (during address cycles Fd 1–Fd 4) and then return the data to the processor. The timing diagram of FIG. 5 shows the signal sequence to perform this fill operation.

Upon detecting the miss, the BXU will generate the proper 16-byte request on the system (AP) bus. This request will always be aligned on a 16-byte boundary. When the data (TD1, ... Td4) is returned from the system bus during address cycles Td1 ... Td4), the BXU writes the data (4 words a1 ... a4) into the cache, beginning at word address 0 by asserting write enable (WE#) high, with the request type decoded (see FIG. 5) to assert the cacheable write line (CW#) high.

While the 4 new words of data are being loaded from the memory into the cache (during address cycles Fd1 ... Fd4), the processor that issued the request (Ta) continues to wait. The reply to the processor's original request is only issued after the cache fill operation has been completed. This guarantees that the data in the cache will have been updated before the processor gets the data. The advantage is that if an error occurs during the cache fill, the cache fill can be retried without the processor becoming involved.

Prefetching

Refer now to FIG. 4, which is a block diagram of the I/O prefetch logic (63) of FIG. 2, which includes the I/O prefetch control register (80) and the I/O prefetch buffers (82, 84, 86, 88).

Two I/O prefetch channels, Channel 0 and Channel 1, are provided. Each channel has two input buffers made up of four words (16 bytes). Each word of storage also includes a tag bit so that the tag information is correctly buffered. As data is requested from the buffers, the next data block is automatically prefetched and loaded into the empty buffer. The circuitry takes advantage of the three-deep system bus pipeline described in the above identified patents to quickly fill the buffers if they ever get behind because of momentary surges in system bus traffic.

The Prefetch (PR #) signal (95) is used at the interface controls (90) in conjunction with the cacheable (CT) signal (97) and write/read (WR) signal (99) to define the type of requests being issued. The table shown below defines all of the different request types:

| Pr# | CT | WR | → | values during Ta cycle |
|---|---|---|---|---|
| 0 | 0 | 0 | = | read using prefetch channel 0 |
| 0 | 0 | 1 | = | START command for prefetch channel 0 |
| 0 | 1 | 0 | = | read using prefetch channel 1 |
| 0 | 1 | 1 | = | START command for prefetch channel 1 |
| 1 | 0 | 0 | = | noncacheable read |
| 1 | 0 | 1 | = | noncacheable write |
| 1 | 1 | 0 | = | cacheable read (CR#) |
| 1 | 1 | 1 | = | cacheable write (CW#) |

When the PR #prefetch pin (95) is high (1), the current cycle is a nonprefetch local bus cycle. When the prefetch pin (95) is low (0), the current cycle is an I/O prefetch cycle during which the cacheable (CT) pin (97) is used to select one of the two I/O prefetch channels.

The interface controls (90) respond to two special commands, the start Channel 0 command and the start Channel 1 command. The prefetch control register (80) format is shown in FIG. 10:

The four bits of the prefetch control register are decoded by the configuration controls (92) as follows. The I/O Channel 0 active bit (130) is automatically set via set active line (91) whenever a start Channel 0 I/O prefetch command is performed and the configuration bits (134) are set to place the prefetcher in I/O mode (configuration bits =01). The I/O Channel 0 Active bit is always set if the configuration bits are set to place the prefetcher in cache mode (configuration bits=10 or 11). With the I/O Channel 0 Active bit set to 1, Channel 0 will be active provided the configuration bits are set to I/O mode (configuration bits=01). Channel 0 will actively monitor the local bus traffic for address matches and will do the associated prefetch operations.

The I/O Channel 1 active bit (132) is similar to the I/O Channel 0 active bit in that it is automatically set via set active line (91) whenever a start Channel 1 I/O prefetch command is performed and the configuration bits are set to I/O mode (configuration bits=01).

The configuration bits (134) are decoded as follows. If they are set to 00, the prefetcher is off. If they are set to 01, an I/O prefetch operation will be performed and both prefetch Channels 0 and 1 are available for use in transferring sequential I/O data streams.

If the configuration bits are set to 10, a cache prefetch operation is configured for one channel. Channel 0 is available for use with the cache and Channel 1 is disabled.

If the configuration bits are set to 11, a cache prefetch operation is configured for two channels. Both channel 0 and channel 1 are available for use with the cache. Channel 0 will always be used to handle cache prefetches associated with requests from Processor 0, and Channel 1 will be used to handle cache prefetches associated with requests from Processor 1. The processor that owns the request is determined by monitoring the local bus arbitration lines.

Start Command

Before a prefetch channel can be used, it must be sent a start command. A start command is defined as a one word or less write to one of the prefetch channels. The address in the write request is the starting address for the prefetch channel. In response to the start command, the prefetch control logic performs the following actions. First it marks both prefetch buffers in the specified channel as empty, via mark 1 line (96) or mark 0 line (94). It then computes "my starting address." If this BXU is to be involved in the data transfer, then the appropriate I/O channel active bit is set in the prefetch control register (80). If this BXU is involved in the data transfer, the control logic (90) in the BXU will issue two prefetch requests (98) on the AP bus. This request will be used to fill the 32 bytes of data buffering in the associated channel. The BXU will reply to the start command when the actions listed above have been completed in all of the other BXUs. The SS busy #line (101) is monitored for BXU to BXU communication. When the SS busy #line is asserted, the prefetch request in all the BXUs will have been initiated.

The combination of the start command and the prefetch pin (PR #) eliminate all stale data. The start command clears out any potential stale data that may have been prefetched during the previous I/O prefetch sequence. The prefetch signal (PR#) ensures that only the software currently using the prefetch channel will receive data from the prefetch buffers. Even if a request is to a location already in the I/O prefetch buffer, the BXU will go to memory for the data unless the prefetch signal (PR#) is asserted.

Typical I/O Prefetch Operation

Before an I/O prefetch operation can begin, the configuration bits (bits 2 and 3) in the prefetch control register (80) must be set to 01.

Start-Up

If prefetcher channels are not assigned statically, then the software or microcode must allocate a channel to a particular data transfer. Then a start command is issued to this I/O prefetch channel. This involves a write request (WR) with the prefetch pin (PR#) asserted using the address of the first byte to be prefetched.

Data Transfer

In order for a data transfer request to be a valid one for response by the prefetcher, it must meet the following criteria. It must be a standard read request. The length of the data request must be byte, double byte, word, or multiple words, and the address must be recognized in one of the local bus address recognizers. The request must also pull the prefetch signal (PR 95) low and have the CT signal (97) point to the correct prefetch channel.

Normally, the requested data will already be present in the I/O prefetch channel data buffer, in which case the prefetcher will return the data immediately. If the data is not in the buffer, then the request will be held until the AP bus request (98), issued earlier when the buffer was first emptied, fills the buffer.

When a data buffer request is received, the control logic (90) uses the word and size address lines and the byte enable lines (not shown) to determine which bytes in the current prefetch buffer should be used.

When the last byte in a buffer is read, the prefetcher (63) computes the address for the next 16-byte block to be prefetched and issues an AP bus read request (98). The address (103) sent with the processor's prefetch request is used for this calculation along with the current interleaving factor specified by the local bus interface at local bus control logic (68) for this address range. The address sent on the AP bus is guaranteed to be within the memory recognition window of the MCU (50) because the address incrementer only goes through LAD bit 17 and the memory recognizers only look at bits 18 through 31.

While the invention has been particularly shown and described with reference to preferred embodiments thereof, it will be understood by those skilled in the art that the foregoing and other changes in form and detail may be made therein without departing from the scope of the invention.

What is claimed is:

1. For use in a bus expander unit (10) which is part of a data processing system in which a first processor (14) and a second processor (16) communicate over a local bus (18) with a plurality of memories (2, 4) connected to one or more system buses (20, 22), said bus expander unit (10) providing an interface between said local bus (18) and said system bus (20), said bus expander unit including local bus control logic (68) for controlling access to said local bus (18), said bus expander unit including system bus control logic (60) for controlling access to said system bus (20); and, a cache data-array (24) connected to said bus expander unit (10) and to said local bus (18);

said local bus carrying a bus address (67) comprised of a tag portion, a set portion, and a line portion, a line consisting of a plurality of data bytes, said line being the basic unit of data transferred between said cache (24) and said memories (2, 4);

the combination comprising:

control logic in said bus expander unit for controlling references to said cache data-array;

said control logic including a cache directory (62), said cache directory including an address store (65) for storing tag fields, each tag field identifying a memory location in one of said memories that is associated with an address block (69) stored in said cache (24);

said directory including means for generating a cache data-array address (73) comprised of a set portion identical to said set portion of said bus address (67), a line portion identical to said line portion of said bus address (67), and a way portion (75);

a plurality of address blocks stored in said address store (65), each address block describing a physical address of a number of contiguous lines of data stored in said cache data-array;

a plurality of valid bits stored in said address store (65), each valid bit being associated with each one of said lines of data within said address block in said address store (65), such that if a particular line of data is present in said cache, then the valid bit for that line is on, and if a particular line is not present in said cache, then the valid bit for that line is off;

said cache directory (62) is being configured into a plurality groups of storage locations (ways 0, 1, 2, 3), each way providing storage for said tag fields and said valid-bits for facilitating the associative searching of said directory for a particular tag field;

said directory (62) including a decoder (71) connected to said address bus (67) and to said address store (65);

said address store (65) being divided into a plurality of sets (SET 0-SET 63), each set being a grouping of said address blocks consisting of one address block from each way, all of the address blocks in a set being simultaneously selected by said decoder (71) in response to the decoding of said set portion of said bus address;

first means (64) connected to said local bus control logic (68) and to said cache directory (62), said first means including first configuration control means (102) for specifying the number of ways enabled in said cache directory and second configuration control means (100) for specifying the number of lines enabled in one of said address blocks;

a number of compare circuits (70, 72, 74, 76) equal to the number of said ways, said compare circuits being connected to said bus address (67) and to said address store (65) such that simultaneous comparisons are made in said compare circuits (70-76) between said tag portion of said bus address (67) and said tag fields in said number of ways specified by said first configuration control means (102) to determine if the data corresponding to said bus address (67) is in said cache data-array, a hit occurring when the tag field of an address block matches said tag portion of said bus address and the valid bit of the line specified in said bus address is on; and, encoding means (77) responsive to said compare circuits (70, 72, 74, 76), for generating at an output (75), said output (75) being said way portion of said cache data array address (73).

2. The combination in accordance with said claim 1 further comprising:

a prefetch buffer (63) connected to said local bus control logic (68) and to said first means (64); and, wherein said first means (64) includes first prefetch control means (134) connected to said prefetch buffer for splitting said prefetch buffer into two logical channels, a first channel for handling prefetches associated with requests from said first processor (14) and a second channel for handling prefetches associated with requests from said second processor (16).

3. The combination in accordance with said claim 1 wherein said first means (64) further includes third configuration control means (108) for enabling said cache for operation.

4. The combination in accordance with said claim 1 further comprising:

a prefetch buffer (63) connected to said local bus control logic (68) and to said first means (64); and, wherein said first means (64) includes first prefetch control means (134) connected to said prefetch buffer the state of said first prefetch control means (134) indicating that the prefetcher is off, enabled to transfer sequential I/O data streams, or operating with said cache.

* * * * *

UNITED STATES PATENT AND TRADEMARK OFFICE
CERTIFICATE OF CORRECTION

PATENT NO. : 4,853,846
DATED : Aug. 1, 1989
INVENTOR(S) : Johnson, et al.

It is certified that error appears in the above-identified patent and that said Letters Patent is hereby corrected as shown below:

Column 11, line 33, change "is being" to --is--.

Signed and Sealed this

Fifth Day of June, 1990

*Attest:*

HARRY F. MANBECK, JR.

*Attesting Officer*   *Commissioner of Patents and Trademarks*